No. 759,107. PATENTED MAY 3, 1904.
W. T. HOLLAND.
VISE.
APPLICATION FILED SEPT. 12, 1903.
NO MODEL.

Witnesses
Edwin G. McKee
Herbert D. Lawson

Inventor
William T. Holland
By Victor J. Evans
Attorney

No. 759,107.

Patented May 3, 1904.

UNITED STATES PATENT OFFICE.

WILLIAM T. HOLLAND, OF SUFFOLK, VIRGINIA.

VISE.

SPECIFICATION forming part of Letters Patent No. 759,107, dated May 3, 1904.

Application filed September 12, 1903. Serial No. 172,982. (No model.)

*To all whom it may concern:*

Be it known that I, WILLIAM T. HOLLAND, a citizen of the United States, residing at Suffolk, in the county of Nansemond and State of Virginia, have invented new and useful Improvements in Vises, of which the following is a specification.

My invention relates to new and useful improvements in vises especially adapted for holding concave circular saws in position while being filed.

Another object is to employ a vise of simple, durable, and inexpensive construction which can be readily attached to an ordinary work-bench and which can be adjusted so as to hold a saw at any desired angle.

With the above and other objects in view the invention consists in the novel construction and combination of parts hereinafter more fully described and claimed, and illustrated in the accompanying drawings, showing the preferred form of my invention, and in which—

Figure 1:
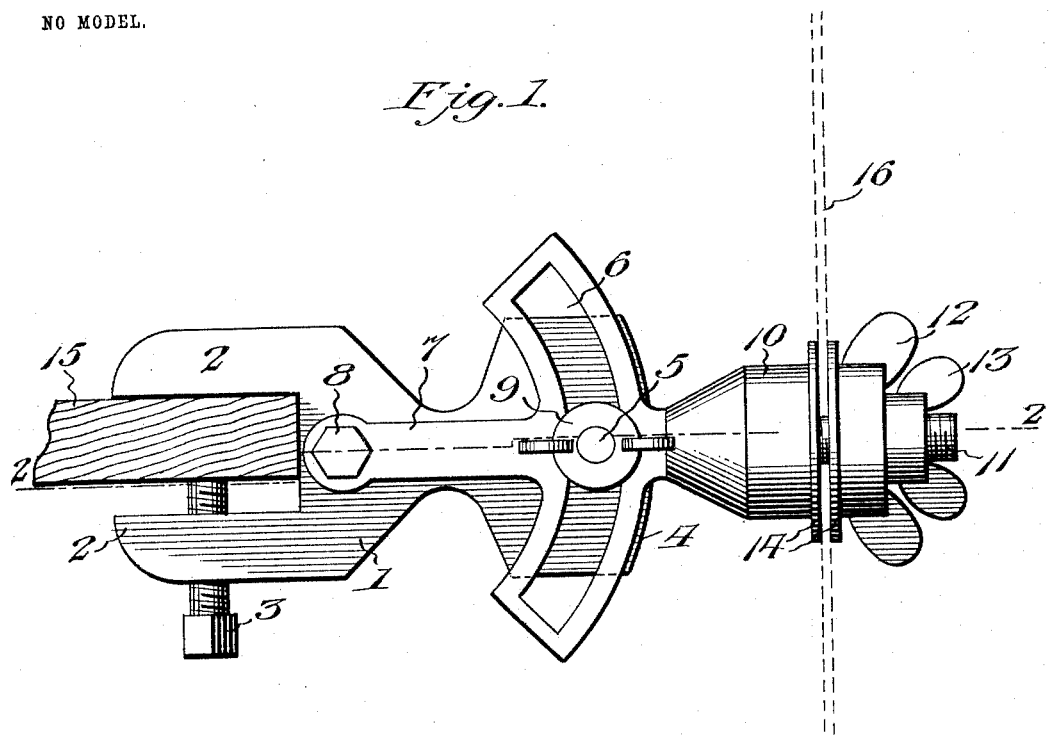
Figure 2:
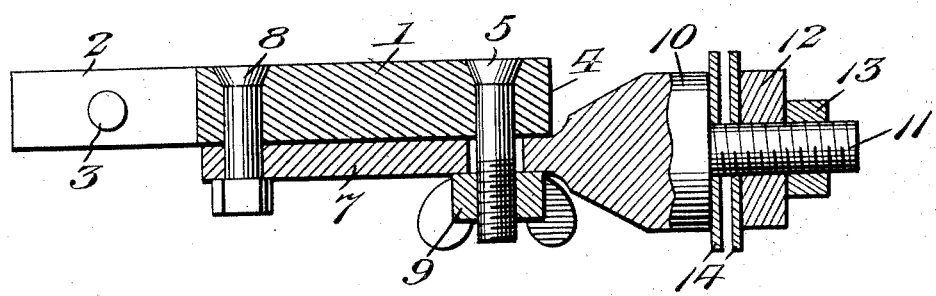

Figure 1 is a side elevation of the vise and showing in dotted lines a saw in position therein; and Fig. 2 is a section on line 2 2, Fig. 1.

Referring to the figures by numerals of reference, 1 is the body of the vise, having parallel arms 2 extending from one end thereof and adapted to receive the edge of a workbench therebetween. A set-screw 3 is arranged in the lower arm 2 and is adapted to clamp the body 1 upon the bench. The body 1 has a head 4 at its outer end in which is secured a laterally-extending screw 5. This screw projects into a curved slot 6, which is formed within an arm 7, fulcrumed upon a pin 8, which extends laterally from the body 1. A nut 9 is arranged on the screw 5 and is adapted to clamp the arm 7 in any position to which it may be adjusted in relation to the body 1. The arm 7 has an enlarged head 10, preferably cylindrical in form, and from the center of this head projects a longitudinally-extending screw 11, having a binding-nut 12 thereon and preferably a locking-nut 13. Washers 14 are interposed between the head and the binding-nut, as shown.

To use this device, the arms 2 are clamped upon the edge of the top 15 of a workbench, and the nuts 12 and 13 and the outer washer 14 are removed from screw 11 and a saw 16 placed upon said screw and against the other washer 14. Said nuts and washer are then returned into position upon the screw and are utilized for clamping the saw in position. The arm 7 is then adjusted to any desired angle in relation to the body 1 by loosening the nut 9 and moving the screw 5 to any desired point in the curved slot 6. Said arm is then locked in adjusted position by clamping it between the body 1 and the nut 9.

By means of this device it will be seen that a saw can be securely held at any desired angle and that the filing of the teeth is thus greatly facilitated.

The device is extremely simple and inexpensive in construction and can be manufactured at slight cost.

In the foregoing description I have shown the preferred form of my invention; but I do not limit myself thereto, as I am aware that modifications may be made therein without departing from the spirit or sacrificing any of the advantages thereof, and I therefore reserve the right to make such changes as fairly fall within the scope of my invention.

Having thus described the invention, what is claimed as new is—

In a vise, the combination with a body having arms extending therefrom, and securing means within one of the arms; of an arm pivoted to the body and having a curved slot therein, a screw extending from the body and through the slot, a clamping device upon the screw for locking the arm in adjusted position, a head integral with the arm, a screw extending therefrom, and means upon the screw for clamping a saw upon a head.

In testimony whereof I affix my signature in presence of two witnesses.

WILLIAM T. HOLLAND.

Witnesses:
 WILLIS ROBESON,
 S. M. LAWRENCE.